(12) United States Patent
Xu et al.

(10) Patent No.: US 11,081,123 B2
(45) Date of Patent: Aug. 3, 2021

(54) MICROPHONE ARRAY-BASED TARGET VOICE ACQUISITION METHOD AND DEVICE

(71) Applicant: IFLYTEK CO., LTD., Anhui (CN)

(72) Inventors: Dongyang Xu, Anhui (CN); Haikun Wang, Anhui (CN); Zhiguo Wang, Anhui (CN); Guoping Hu, Anhui (CN)

(73) Assignee: IFLYTEK CO., LTD., Anhui (CN)

( * ) Notice: Subject to any disclaimer, the term of this patent is extended or adjusted under 35 U.S.C. 154(b) by 0 days.

(21) Appl. No.: 16/757,905

(22) PCT Filed: Jul. 16, 2018

(86) PCT No.: PCT/CN2018/095765
§ 371 (c)(1),
(2) Date: Apr. 21, 2020

(87) PCT Pub. No.: WO2019/080553
PCT Pub. Date: May 2, 2019

(65) Prior Publication Data
US 2020/0342887 A1 Oct. 29, 2020

(30) Foreign Application Priority Data
Oct. 23, 2017 (CN) .......................... 201710994211.5

(51) Int. Cl.
*G10L 21/0216* (2013.01)
*G10L 25/78* (2013.01)
(Continued)

(52) U.S. Cl.
CPC .......... *G10L 21/0216* (2013.01); *G10L 25/78* (2013.01); *H04R 3/005* (2013.01); *G10L 17/00* (2013.01); *G10L 2021/02166* (2013.01)

(58) Field of Classification Search
CPC . G10L 21/0216; G10L 21/0208; G10L 25/78; G10L 15/04; G10L 15/20; G10L 17/00; G10L 2021/02166; H04R 3/005
See application file for complete search history.

(56) References Cited

U.S. PATENT DOCUMENTS

2005/0195988 A1* 9/2005 Tashev .................. H04R 3/005
381/92
2009/0055170 A1* 2/2009 Nagahama .............. G10L 15/20
704/226
(Continued)

FOREIGN PATENT DOCUMENTS

| CN | 102196109 A | 9/2011 |
|---|---|---|
| CN | 102610227 A | 7/2012 |

(Continued)

OTHER PUBLICATIONS

Chinese Office Action received in 201710994211.5 dated Apr. 22, 2020, pp. 11.

(Continued)

*Primary Examiner* — Yogeshkumar Patel
(74) *Attorney, Agent, or Firm* — Zhong Law, LLC

(57) ABSTRACT

A microphone array-based target voice acquisition method and device, said method comprising: receiving voice signals acquired on the basis of a microphone array (101); determining a pre-selected target voice signal and a direction thereof (102); performing strong directional gain and weak directional gain on the pre-selected target voice signal, so as to obtain a strong gain signal and a weak gain signal (103); performing an endpoint detection on the basis of the strong gain signal, so as to obtain an endpoint detection result (104); and performing endpoint processing on the weak gain signal according to the endpoint detection result, so as to obtain a final target voice signal (105). The present invention can obtain an accurate and reliable target voice signal, (Continued)

thereby avoiding an adverse effect of the target voice quality on subsequent target voice processing.

18 Claims, 3 Drawing Sheets

(51) Int. Cl.
  *H04R 3/00* (2006.01)
  *G10L 17/00* (2013.01)

(56) References Cited

U.S. PATENT DOCUMENTS

| | | | |
|---|---|---|---|
| 2011/0286604 A1 | 11/2011 | Matsuo | |
| 2012/0078624 A1 | 3/2012 | Yook et al. | |
| 2012/0183149 A1 | 7/2012 | Hiroe | |
| 2012/0224456 A1 | 9/2012 | Visser et al. | |
| 2014/0067386 A1* | 3/2014 | Zhang | G10L 21/0208 704/226 |

FOREIGN PATENT DOCUMENTS

| | | |
|---|---|---|
| CN | 102800325 A | 11/2012 |
| CN | 102969002 A | 3/2013 |
| CN | 103248992 A | 8/2013 |
| CN | 103426440 A | 12/2013 |
| CN | 103544959 A | 1/2014 |
| CN | 104038880 A | 9/2014 |
| CN | 106952653 A * | 7/2017 |
| CN | 106952653 A | 7/2017 |
| CN | 107742522 A | 2/2018 |
| JP | 2005520211 A | 7/2005 |
| JP | 200786554 A | 4/2007 |
| JP | 2011244232 A | 12/2011 |
| JP | 2011257627 A | 12/2011 |
| JP | 2014514794 A | 6/2014 |
| WO | 03096031 A2 | 11/2003 |
| WO | 2016076237 A1 | 5/2016 |

OTHER PUBLICATIONS

Yang et al., "Speech Enhancement Based on Super Gain Beamforming of Microphone Array—Time Domain Approach".
International Search Report and the Written Opinion issued in PCT/CN2018/095765 dated Oct. 18, 2018, 16 pages.
Japanese Office Action received in JP2020542484 dated Apr. 22, 2021, pp. 6.

* cited by examiner

MICROPHONE ARRAY-BASED TARGET VOICE ACQUISITION METHOD AND DEVICE

The present application is the US national phase of International patent application NO. PCT/CN2018/095765, titled "MICROPHONE ARRAY-BASED TARGET VOICE ACQUISITION METHOD AND DEVICE", filed Jul. 16, 2018, which claims priority to Chinese Patent Application No. 201710994211.5, titled "MICROPHONE ARRAY-BASED TARGET VOICE ACQUISITION METHOD AND DEVICE", filed on Oct. 23, 2017, with the China National Intellectual Property Administration, both of which are incorporated herein by reference in their entirety.

TECHNICAL FIELD

The present disclosure relates to the field of voice signal processing, and in particular, to a microphone array-based method and for obtaining a target voice and a device thereof.

BACKGROUND

With the rapid development of information technology, more and more intelligent interactive products emerge. Voice as one of the most natural and convenient manner of interactions is currently a mainstream interaction approach for intelligent interaction products. In practical voice interaction processes, the interaction effectiveness is directly affected by the voice quality. However, the real environment is complex and changeable, and there are various types of noises that affect the voice quality. Therefore, how to effectively eliminate the noise and improve the quality of the target voice is extremely important in the interactive scene.

Currently, the mainstream noise reduction method for target voice is a noise reduction based on a microphone array, which uses multiple microphones to obtain spatial information of the voice signal, performs voice enhancement on a target signal in a target direction, and suppresses noise in a non-target direction. This method works well when the number of microphones is large, but in practice, considering the cost and layout constraints of the device, the number of microphones is difficult to reach the ideal number. At this time, the pickup zone for each beam direction is large, and a beam corresponding to a signal in the target direction is likely to contain both target voice and non-target voice. During the signal enhancement process in the target direction, if the noise is to be removed for the purpose of strong noise suppression, it may cause the target voice to be distorted, resulting in an irreversible impact on the target voice processing. Therefore, in the conventional technology, strong noise suppression is generally not performed. In such cases, there will be noise residues. The noise residues will cause inaccurate endpoint detection, and consequently, in the subsequent target voice processing, such as voice recognition, various inserting or missing errors due to inaccurate endpoint detection will appear, affecting the user experience.

SUMMARY

The embodiments of the present disclosure provide a method and a device for obtaining a target voice based on a microphone array, so as to obtain an accurate and reliable target voice signal, thereby preventing the target voice quality from adversely affecting subsequent target voice processing.

To this end, the present disclosure provides the following technical solutions.

A method for obtaining a target voice based on a microphone array includes:

receiving a voice signal collected based on the microphone array;

determining a pre-selected target voice signal and a direction of the pre-selected target voice signal;

performing strong directional gaining processing and weak directional gaining processing on the pre-selected target voice signal to respectively obtain a strong gained signal and a weak gained signal;

performing an endpoint detection based on the strong gained signal to obtain an endpoint detection result; and performing endpoint processing on the weak gained signal according to the endpoint detection result to obtain a final target voice signal.

Preferably, determining the pre-selected target voice signal and the direction of the pre-selected target voice signal includes:

determining the pre-selected target voice signal and the direction of the pre-selected target voice signal through sound source localization.

Preferably, determining the pre-selected target voice signal and the direction of the pre-selected target voice signal includes:

performing beamforming processing on the voice signal to obtain beams in different directions; and selecting, from the beams in different directions, a beam that satisfies a preset condition, and determining the target voice signal and the direction of the target voice signal based on the selected beam.

Preferably, performing the strong directional gaining processing and the weak directional gaining processing on the pre-selected target voice signal to respectively obtain the strong gained signal and the weak gained signal includes:

setting a pickup zone angle and a transition zone angle of a strong directional gain, and a pickup zone angle and a transition zone angle of the weak directional gain, where the pickup zone angle of the strong directional gain is smaller than the pickup zone angle of the weak directional gain, and the transition zone angle of the strong directional gain is smaller than the transition zone angle of the weak directional gain;

determining, based on the pickup zone angle and transition zone angle of the strong directional gain, the strong directional gain that is based on an azimuth angle of a sound source, and determining, based on the pickup zone angle and transition zone angle of the weak directional gain, the weak directional gain that is based on the azimuth angle of the sound source, where the azimuth angle of the sound source refers to an azimuth angle of the pre-selected target voice signal; and obtaining the strong gained signal and the weak gained signal according to the strong directional gain and the weak directional gain that are based on the azimuth angle of the sound source, respectively.

Preferably, the pickup zone angle of the strong directional gain is smaller than an angle of a main lobe of the pre-selected target voice signal.

Preferably, performing strong the directional gaining processing and weak directional gaining processing on the pre-selected target voice signal to respectively obtain the strong gained signal and the weak gained signal further includes:

calculating a smooth energy ratio γ of the pre-selected target signal to an interference signal;

determining a gain adjustment coefficient based on the smooth energy ratio γ, a preset high energy ratio threshold, and a low energy ratio threshold; and adjusting the strong directional gain and the weak directional gain according to the gain adjustment coefficient.

Preferably, determining the gain adjustment coefficient based on the smooth energy ratio γ, the preset high energy ratio threshold, and the low energy ratio threshold includes:

setting the gain adjustment coefficient to be 1 in a case that the smooth energy ratio γ is greater than the high energy ratio threshold;

setting the gain adjustment coefficient to be $K_0$ in a case that the smooth energy ratio γ is less than the low energy ratio threshold; and setting the gain adjustment coefficient to be $K_1$ in a case that the smooth energy ratio γ is greater than or equal to the low energy ratio threshold and less than or equal to the high energy ratio threshold, where $K_1 > K_0$.

Preferably, the method further includes:

performing self-adaptive filtering and noise reduction processing on each beam, before the pre-selected target voice signal and the direction of the pre-selected target voice signal are determined based on the beam that meets the preset condition; or performing self-adaptive filtering and noise reduction processing on the pre-selected target voice signal, after the pre-selected target voice signal and the direction of the preselected target voice signal are determined.

A device for obtaining a target voice based on a microphone array includes: a signal receiving module, a pre-selection module, a gaining processing module, an endpoint detection module, and a target voice extraction module;

where the signal receiving module is configured to receive a voice signal collected based on the microphone array, and output the voice signal to the pre-selection module;

the pre-selection module is configured to determine a pre-selected target voice signal and a direction of the pre-selected target voice signal;

the gaining processing module is configured to perform strong directional gaining processing and weak directional gaining processing on the pre-selected target voice signal, to respectively obtain a strong gained signal and a weak gained signal, output the strong gained signal to the endpoint detection module, and output the weak gained signal to the target voice extraction module;

the endpoint detection module is configured to perform an endpoint detection based on the strong gained signal, and output an endpoint detection result to the target voice extraction module; and the target voice extraction module is configured to perform endpoint processing on the weak gained signal according to the endpoint detection result, to obtain a final target voice signal.

Preferably, the pre-selection module is configured to determine the pre-selected target voice signal and the direction of the pre-selected target voice signal through sound source localization.

Preferably, the pre-selection module includes:

a beamforming unit, configured to perform beamforming processing on the voice signal to obtain beams in different directions; and a determining unit, configured to select a beam that meets a preset condition from the beams in different directions obtained by the beamforming unit, and determine the pre-selected target voice signal and the direction of the pre-selected target voice signal based on the selected beam.

Preferably, the gaining processing module includes:

an angle setting unit, configured to set a pickup zone angle and a transition zone angle of a strong directional gain, and a pickup zone angle and a transition zone angle of a weak directional gain, where the pickup zone angle of the strong directional gain is smaller than the pickup zone angle of the weak directional gain, and the transition zone angle of the strong directional gain is smaller than the transition zone angle of the weak directional gain;

a gain calculation unit, configured to determine, based on the pickup zone angle and the transition zone angle of the strong directional gain, the strong directional gain that is based on an azimuth angle of a sound source and determine, based on the pickup zone angle and the transition zone angle of the weak directional gain, the weak directional gain that is based on the azimuth angle of the sound source, where the azimuth angle of the sound source refers to an azimuth angle of the pre-selected target voice signal; and a gained signal generation unit, configured to obtain the strong gained signal and the weak gained signal according to the strong directional gain and the weak directional gain that are based on the azimuth angle of the sound source, respectively.

Preferably, the pickup zone angle of the strong directional gain is smaller than an angle of a main lobe of the pre-selected target voice signal.

Preferably, the gaining processing module further includes:

an energy ratio threshold setting unit, configured to set a high energy ratio threshold and a low energy ratio threshold;

an energy ratio calculation unit, configured to calculate a smooth energy ratio γ of the pre-selected target signal to an interference signal;

a gain adjustment coefficient determination unit, configured to determine a gain adjustment coefficient based on the smooth energy ratio γ, the high energy ratio threshold and the low energy ratio threshold; and a gain correction unit, configured to adjust the strong directional gain and the weak directional gain obtained by the gain calculation unit according to the gain adjustment coefficient.

Preferably, the pre-selection module further includes:

a noise reduction unit disposed between the beamforming unit and the determining unit, and configured to perform self-adaptive filtering and noise reduction processing on each beam obtained by the beamforming unit;

or; the device further includes:

a noise reduction module disposed between the pre-selection module and the gaining module, and configured to perform self-adaptive filtering and noise reduction processing on the pre-selected target voice signal determined by the pre-selection module.

A computer-readable storage medium includes computer program codes, where the computer program codes are executed by a computer unit to cause the computer unit to perform the steps in the method for obtaining a target voice based on a microphone array described above.

A device for obtaining a target voice based on a microphone array includes a processor, a memory, and a system bus, where the processor and the memory are connected to each other through the system bus; and the memory is configured to store one or more programs, and the one or more programs include instructions that, when executed by the processor, cause the processor to perform the steps in the method for obtaining a target voice based on a microphone array described above.

A computer program product, when running on a terminal device, causes the terminal device to perform the steps in the method for obtaining a target voice based on a microphone array described above.

The method and device for obtaining a target voice based on a microphone array are provided in the embodiments of the present disclosure. A voice signal collected based on the microphone array is received, a pre-selected target voice signal and a direction of the pre-selected target voice signal are determined, and then strong directional gaining processing and weak directional gaining processing are performed on the pre-selected target voice signal, to respectively obtain a strong gained signal and a weak gained signal. Since there is less noise signal residue in the voice signal after being strongly gained, an accurate endpoint detection result can be obtained based on the strong gained signal. The distortion of the target voice is very small in the voice signal after being weakly gained; therefore, a target voice signal with higher fidelity can be obtained by performing endpoint processing on the weak gained signal according to the endpoint detection result.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure. The drawings in the following descriptions are only some embodiments of the present disclosure, and other drawings may be obtained by those ordinary skilled in the art based on the provided drawings without any creative efforts.

DETAILED DESCRIPTION

In order to enable those skilled in the art to better understand the solutions of the embodiments of the present disclosure, the embodiments of the present disclosure will be further described in detail below with reference to the accompanying drawings and embodiments.

Voice enhancement aims to reduce or even eliminate the noise in the received signal without damaging the target voice structure, thereby improving voice intelligibility. To this end, embodiments of the present disclosure provide a method and a device for obtaining a target voice based on a microphone array. A pre-selected target voice signal and a direction of the pre-selected target voice signal are determined based on a voice signal that is received by the microphone array, strong directional gaining processing and weak directional gaining processing are performed on the pre-selected target voice signal, to respectively obtain a strong gained signal and a weak gained signal, an endpoint detection is performed based on the strong gained signal to obtain an endpoint detection result, and endpoint processing is performed on the weak gained signal according to the endpoint detection result to obtain a final target voice signal.

Figure 1:
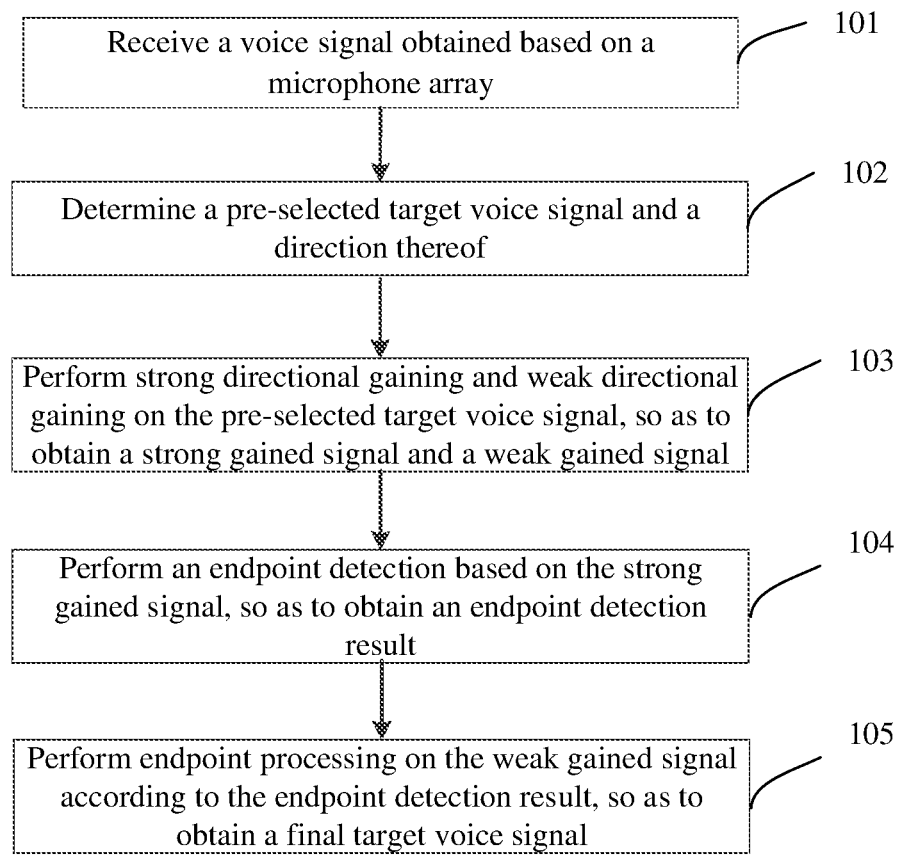
FIG. 1 is a flowchart of a method for obtaining a target voice based on a microphone array according to an embodiment of the present disclosure.

FIG. 1 is a flowchart of a method for obtaining a target voice based on a microphone array according to an embodiment of the present disclosure. The method includes the following steps.

In step 101, a voice signal collected based on the microphone array is received.

In a practical application, the voice signal may need to be pre-processed after being received.

Taking a voice signal received by a microphone array including M microphones as an example, pre-processing the voice signal primarily refers to transforming the received voice signal from the time domain to the frequency domain, to obtain a frequency-domain voice signal $x(k,l)=[x_1(k,l), x_2(k,l) \ldots x_m(k,l) \ldots x_M(k,l)]^T$, where $x_m(k,l)$ represents a frequency-domain voice signal received by an $m^{th}$ microphone, k represents a frequency of the signal and l represents a voice frame identification number.

In step 102, a pre-selected target voice signal and a direction of the pre-selected target voice signal are determined.

In an embodiment of the present disclosure, the pre-selected target voice signal may be a specific command word voice signal and/or a specific target human voice signal, an effective voice signal and the like. No matter what type of the voice signal is, the pre-selected target voice signal and the direction of the pre-selected target voice signal can be determined using sound source localization. The specific process of the sound source localization is the same as that in the conventional technology, which will not be repeated herein.

Before the pre-selected target voice signal and the direction of the pre-selected target voice signal are determined using sound source localization, noise reduction processing may also be performed on the voice signal. Specifically, some noise reduction methods in the conventional technology may be adopted without limitations to the embodiments of the present disclosure.

In addition, when determining the pre-selected target voice signal and its direction, beamforming processing may be performed on the voice signal to obtain beams in different directions; then, a beam that satisfies a preset condition is selected from the beams in different directions, and the target voice signal and its direction are determined according to the selected beam.

The beamforming may specifically adopt an existing technology, such as a self-adaptive algorithm based on direction estimation, a beamforming method based on a signal structure etc., without limitation to the embodiments of the present disclosure.

The fixed beamforming process by the microphone is described as follows.

Assuming that M microphones form N fixed beams, beamforming coefficients corresponding to the microphones are:

$$w(k,l)=[w_1(k,l),w_2(k,l), \ldots ,w_M(k,l)]^T, \quad (1)$$

where k represents the frequency of the signal and l represents the voice frame identification number.

The output of the fixed beams is:

$$\text{fix}(k,l)=w^H(k,l)x(k,l). \quad (2)$$

The above-mentioned fixed beamforming coefficients may be calculated based on the principle that the desired direction signal contains no distortion and the output signal power in other directions is sufficiently small.

It should be noted that in practical applications, after the beams are obtained, self-adaptive filtering and noise reduction processing may be performed on the beams. The self-adaptive filtering and noise reduction processing includes processing such as multi-channel de-reverberation, generalized sidelobe cancellation and other existing noise reduction methods, which is not limited thereto. The following description uses generalized sidelobe cancellation as an example.

The purpose of generalized sidelobe cancellation is to suppress signals in non-target directions. The specific implementation process is described as follows.

Firstly, a noise reference signal is obtained by:

$$u(k,l) = B(k,l)^H x(k,l), \quad (3)$$

where $u = [u_1(k,l), L, u_{M-1}(k,l)]^T$ is a $(M-1) \times 1$ vector; and $B(k,l)$ is an $(M-1) \times M$ blocking matrix, which may be obtained based on the principle of maximally suppressing the signal in a desired direction, and is used to obtain the noise reference signal with the target signal removed.

A noise signal is then filtered from the fixed beam signal. The noise signal in the fixed beam signal may be obtained by multiplying the noise reference signal by a coefficient. The final desired beam signal may be expressed as:

$$Y(k,l) = \text{fix}(k,l) - H(k,l)^H u(k,l), \quad (4)$$

where $H(k,l)^H$ represents a filter coefficient, which may be obtained by updating by a normalized linear minimum mean square error (LMS) algorithm.

As mentioned earlier, in the embodiment of the present disclosure, the pre-selected target voice signal may be a specific command word voice signal and/or a specific target human voice signal. In this case, a specific command word and/or voiceprint recognition may be performed on each beam, after identifying a specific command word and/or a specific target human, a beam for which a recognition result satisfies a preset condition, for example, a beam with the highest recognition score, is selected as the pre-selected target voice signal, and accordingly, the direction of the selected beam is the direction of the pre-selected target voice signal. In a the case where the pre-selected target voice signal is an effective voice signal, the pre-selected target voice may be selected from the beams based on a set criterion and its direction may be determined. The set criterion may be any one or a combination of the following: maximum energy and highest signal-to-noise ratio.

It should be noted that the steps of multi-channel de-reverberation and generalized sidelobe cancellation in the self-adaptive filtering and noise reduction processing of the above-mentioned voice signal may also be performed after the direction of the target voice is determined, if it is allowed by the accuracy of location determination, that is, self-adaptive filtering and noise reduction processing are performed on the pre-selected target voice signal without limitation to the embodiment of the present disclosure.

In step 103, strong directional gaining and weak directional gaining are performed on the pre-selected target voice signal, to respectively obtain a strong gained signal and a weak gained signal.

GSC (Generalized Sidelobe Canceller) can only suppress the noise in some of the non-target directions when suppressing the noise in the non-target directions, and the noise can be further suppressed through directional gaining processing.

To this end, in the embodiment of the present disclosure, a voice signal subjected to strong directional gaining processing (i.e., a strong gained signal) and a voice signal subjected to weak directional gaining processing (i.e., a weak gained signal) are obtained by directional gaining processing of two intensities. The strong gained signal obtained after the processing has less residual noise signals, but the target voice signal has relatively large distortion, while the weak gain signal has an opposite property.

The process of gaining processing is as described follows:

1) a pickup zone angle and a transition zone angle of a strong directional gain, and a pickup zone angle and a transition zone angle of a weak directional gain are set, where the pickup zone angle of the strong directional gain is smaller than the pickup zone angle of the weak directional gain, and the transition zone angle of the strong directional gain is smaller than the transition zone angle of the weak directional gain;

2) the strong directional gain that is based on an azimuth angle of a sound source is determined based on the pickup zone angle and the transition zone angle of the strong directional gain, and the weak directional gain that is based on the azimuth angle of the sound source is determined based on the pickup zone angle and the transition zone angle of the weak directional gain, where the azimuth angle of the sound source refers to an azimuth angle of the pre-selected target voice signal;

3) the strong gained signal and the weak gained signal are obtained according to the strong directional gain and the weak directional gain that are based on the azimuth angle of the sound source, respectively.

Considering the influence on the pre-selected target voice signal under different interference situations, the method further includes the following steps between the above steps 2) and 3): adjusting the strong directional gain and the weak directional gain that are based on the azimuth angle of the sound source. Accordingly, in step 3), the strong gained signal and the weak gained signal need to be obtained according to the adjusted strong directional gain and weak directional gain.

Figure 2:
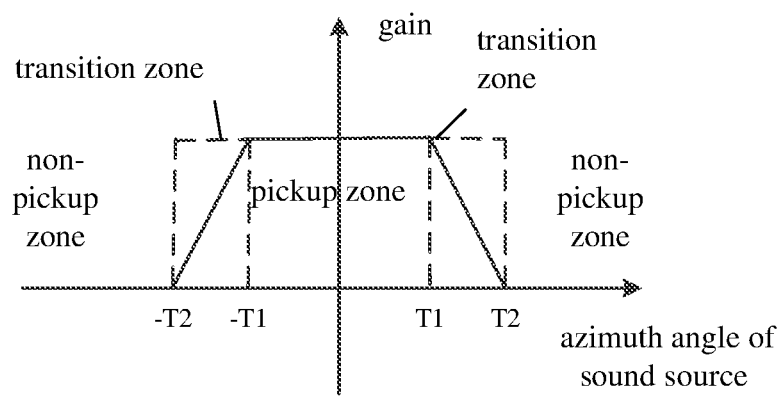
FIG. 2 is a schematic diagram of a gain designed based on an azimuth angle of a sound source according to an embodiment of the present disclosure.

The directional gain is given by the following formula:

$$g_i(\theta, l) = \begin{cases} 1, & -T1 < \theta < T1 \\ \dfrac{T2 - \theta}{T2 - T1}, & (T1 \le \theta \le T2) \,\&\, (-T1 \le \theta \le -T2) \\ 0, & (\theta > T2) \,\&\, (\theta < -T2) \end{cases} \quad (5)$$

where $g_i(\theta, l)$ represents a gain designed based on the azimuth angle $\theta$ of the sound source; as shown in FIG. 2, $\theta$ is the azimuth angle of the sound source, that is, the azimuth angle of the pre-selected target voice signal; the region from −T1 to T1 represents the pickup zone, the region from T1 to T2 and the region from −T2 to −T1 represent the transition zone, and the region where $\theta$ is greater than T2 and less than −T2 represents a non-pickup zone.

It should be noted that the difference between the strong directional gain and the weak directional gain lies is determined by values of T1 and T2.

In the case of the strong directional gain, the value of T1 is small (generally smaller than the angle of the main lobe of the target beam, which may be determined according to the actual application). The value of T2 is designed as close to T1 as possible, so that the transition zone is as narrow as possible to ensure the gain of the non-pickup zone is as small as possible and close to zero. When the pickup zone is small and the transition zone is designed to be narrow, it is easy to cause distortion of the target voice, but as the strong gained signal obtained after the strong directional gaining processing is primarily used for subsequent detection of start and end points of the target voice, the distortion does not make any impact.

In the case of the weak directional gain, the value of T1 is larger than that in the case of the strong directional gain. Generally, the value of T1 may be slightly less than or equal to the angle of the main lobe of the target beam (which may be determined according to the actual application), and the value of T2 may be designed as large as possible, to ensure that the target voice component is not excessively suppressed when the sound source estimation is wrong.

Further, considering the influence on the pre-selected target voice signal under different interference situations, the strong directional gain and the weak directional gain that are based on the azimuth angle of the sound source may also be adjusted. The process of adjusting the gain is described as follows.

First, a smooth energy ratio γ of the pre-selected target signal to an interference signal is calculated, and a gain adjustment coefficient is determined based on the smooth energy ratio γ, a preset high energy ratio threshold and a low energy ratio threshold, so that different smooth energy ratios correspond to different gain adjustment coefficients; and then the strong directional gain and the weak directional gain are adjusted according to the gain adjustment coefficient.

The smooth energy ratio γ may be calculated according to a suitable smoothing method, for example, it can be calculated by using the following formula:

$$\gamma(k,l) = \partial * \gamma(k, l-1) + \beta * \frac{|Y_{target}(k,l)|^2}{|Y_{interfere}(k,l)|^2}, \quad (6)$$

where $\partial$ and $\beta$ are weighting coefficients, $\partial + \beta = 1$, and their values may be determined according to the actual application, such as 0.9 and 0.1, respectively. $Y_{target}(k,l)$ represents the pre-selected target signal, and $Y_{interfere}(k,l)$ represents the interference signal.

When the smooth energy ratio γ is greater than the high energy ratio threshold, the gain adjustment coefficient is set to 1; when the smooth energy ratio γ is less than the low energy ratio threshold, the gain adjustment coefficient is set to $K_0$; when the smooth energy ratio γ is greater than or equal to the low energy ratio threshold and less than or equal to the high energy ratio threshold, the gain adjustment coefficient is set to $K_1$, where $K_1 > K_0$.

For example, a specific formula for adjusting the strong directional gain and the weak directional gain are given as follows:

$$G_i(k,l) = \begin{cases} g_i(\theta, l), & \gamma(k,l) > \gamma_{high} \\ K_1 g_i(\theta, l), & \gamma_{low} \leq \gamma(k,l) \leq \gamma_{high} \\ k_0 g_i(\theta, l), & \gamma(k,l) < \gamma_{low} \end{cases} \quad (7)$$

where $$K_1 = \frac{\gamma(k,l)}{\gamma(k,l)+1} =,$$

i=1,2 correspond to the strong directional gain and the weak directional gain, respectively. γ(k,l) represents the smooth energy ratio of the pre-selected target signal in $l^{th}$ frame with the frequency k to the interference signal. The interference signal may be a beam with the highest energy among the other beams; and $\gamma_{high}$ and $\gamma_{low}$ represent the high energy ratio threshold and the low energy ratio threshold respectively, and their values may be determined based on an actual application, for example, 4 and 0.4, respectively. $K_0$ is a correction coefficient mainly used to correct the gain under double-talk circumstances in a case of the weak directional gain, and generally has a small value, for example, 0.2.

After the strong directional gain and weak directional gain are determined, two gained signals, namely the strong gained signal and the weak gained signal are obtained by:

$$Y_1(k,l) = G_1(k,l)Y(k,l) \quad (8)$$

$$Y_2(k,l) = G_2(k,l)Y(k,l) \quad (9)$$

where Y(k,l) represents the pre-selected target voice signal, $Y_1(k,l)$ and $Y_2(k,l)$ are the strong gained signal and the weak gained signal, respectively.

In step 104, an endpoint detection is performed based on the strong gained signal, to obtain an endpoint detection result.

Endpoint detection is to accurately determine start and end points of a voice from a piece of signal containing the voice, thereby determining both voice signal and non-voice signal. Effective endpoint detection not only reduces the amount of data collected in applications such as voice recognition and processing, but also eliminates the interference of silent and noisy segments, to obtain effective voice signals. Specific endpoint detection may use existing technologies, such as endpoint detection based on short-term energy and short-term average zero-crossing rate, endpoint detection based on cepstrum features, and endpoint detection based on entropy.

In step 105, endpoint processing is performed on the weak gained signal according to the endpoint detection result, to obtain a final target voice signal.

That is, according to the positions of the start point and the end point of the voice obtained in step 105, the final target voice signal is obtained from the weak gained signal.

The method for obtaining a target voice based on a microphone array is provided in the embodiment of the present disclosure. A voice signal collected based on the microphone array is received, a pre-selected target voice signal and a direction thereof are determined, strong directional gaining processing and weak directional gaining processing are performed on the pre-selected target voice signal, to respectively obtain a strong gained signal and a weak gained signal. As there is less residual noise signal in the strong gained signal, an accurate endpoint detection result can be obtained by endpoint detection based on the strong gained signal; as the distortion of the target voice is small in the weak gained signal, a target voice signal with higher fidelity can be obtained by performing endpoint processing on the weak gained signal according to the endpoint detection result.

Accordingly, an embodiment of the present disclosure further provides a computer-readable storage medium including computer program codes, where the computer program codes are executed by a computer unit, so that the computer unit performs the steps in the method for obtaining a target voice based on a microphone array according to the embodiments of the present disclosure.

A device for obtaining a target voice based on a microphone array includes a processor, a memory, and a system bus;

where the processor and the memory are connected to each other through the system bus;

the memory is configured to store one or more programs, where the one or more programs include instructions, and the instructions, when executed by the processor, cause the processor to perform the steps in the method for obtaining a target voice based on a microphone array according to the embodiments of the present disclosure.

Accordingly, an embodiment of the present disclosure further provides a computer program product, where the computer program product, when running on a terminal device, causes the terminal device to perform the steps in the method for obtaining a target voice based on a microphone array according to the embodiments of the present disclosure.

Figure 3:
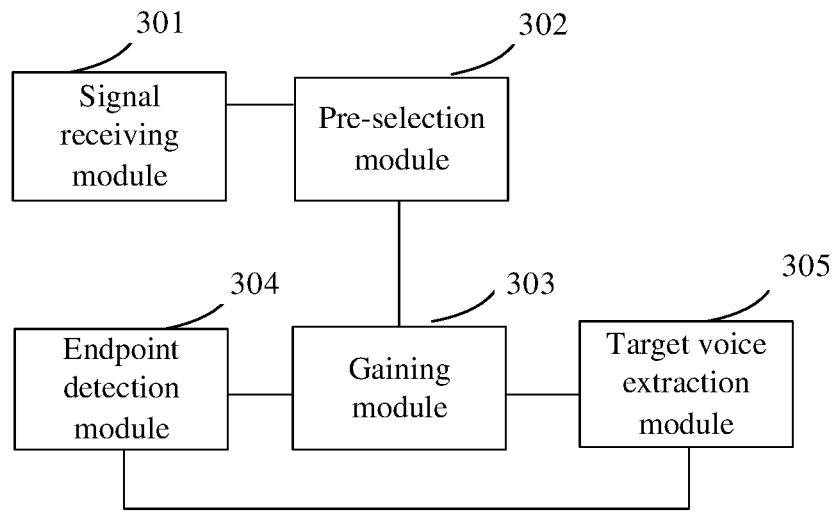
FIG. 3 is a structural block diagram of a device for obtaining a target voice based on a microphone array according to an embodiment of the present disclosure.

Accordingly, an embodiment of the present disclosure further provides a device for obtaining a target voice based on a microphone array. As shown in FIG. 3, which is a structural block diagram of the device, the device includes: a signal receiving module 301, a pre-selection module 302, and a gaining processing module 303, an endpoint detection module 304, a target voice extraction module 305.

The signal receiving module 301 receives a voice signal collected based on the microphone array, and outputs the voice signal to the pre-selection module 302.

The pre-selection module 302 is configured to determine a pre-selected target voice signal and a direction thereof based on the voice signal.

The gaining processing module 303 performs strong directional gaining and weak directional gaining on the pre-selected target voice signal, to respectively obtain a strong gained signal and a weak gained signal, outputs the strong gained signal to the endpoint detection module 304, and outputs the weak gained signal to the target voice extraction module 305.

The endpoint detection module 304 performs an endpoint detection based on the strong gained signal, and outputs an endpoint detection result to the target voice extraction module 305.

The target voice extraction module 305 performs endpoint processing on the weak gained signal according to the endpoint detection result, to obtain a final target voice signal.

In practical applications, the signal receiving module 301 also needs to pre-process the received voice signal. Pre-processing the voice signal mainly refers to transforming the received voice signal from the time domain to the frequency domain, to obtain a frequency-domain voice signal.

In an embodiment of the present disclosure, the pre-selection module 302 may determine the pre-selected target voice signal and its direction through sound source localization.

In another embodiment of the present disclosure, the pre-selection module 302 may first perform beamforming processing on the voice signal to obtain beams in different directions, then select a beam that meets a preset condition, and determine the target voice signal and its direction based on the selected beam. Accordingly, in this embodiment, the pre-selection module 302 may include the following two units:

a beamforming unit, configured to perform beamforming processing on the voice signal to obtain beams in different directions, which may be implemented by existing technologies, such as a self-adaptive algorithm based on direction estimation, a beamforming method based on a signal structure, and the like; and a determining unit, configured to select a beam that meets the preset condition from the beams in different directions obtained by the beam forming unit, and determine the pre-selected target voice signal and its direction based on the selected beam.

For example, the pre-selected target voice signal may be a specific command word voice signal and/or a specific target human voice signal. In this case, the determining unit may perform a specific command word and/or voiceprint recognition on the beams. After identifying a specific command word and/or a specific target human, a beam for which a recognition result satisfies the preset condition, for example, a beam with the highest recognition score, is selected as the pre-selected target voice signal, and accordingly, the direction of the selected beam is the direction of the pre-selected target voice signal.

For example, the pre-selected target voice signal is an effective voice signal. In this case, the determining unit may select the pre-selected target voice from the beams based on a set criterion and determine its direction. The set criterion may be any one or a combination of the following: maximum energy and highest signal-to-noise ratio.

It should be noted that a noise reduction unit may be further provided between the beamforming unit and the determining unit, and is configured to perform self-adaptive filtering and noise reduction processing on the beams obtained by the beamforming unit. The self-adaptive filtering and noise reduction processing includes any one or more of the following: multi-channel de-reverberation, and generalized sidelobe cancellation.

Figure 4:
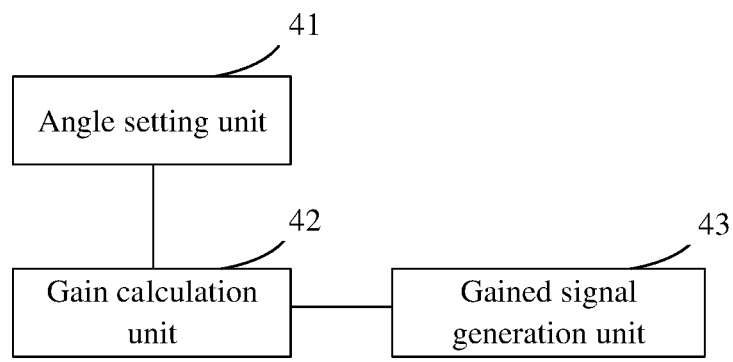
FIG. 4 is a schematic structural diagram of a gaining processing module according to a device embodiment of the present disclosure.

FIG. 4 is a schematic structural diagram of a gaining processing module according to a device embodiment of the present disclosure.

In this embodiment, the gaining processing module includes:

an angle setting unit 41, configured to set a pickup zone angle and a transition zone angle of a strong directional gain, and a pickup zone angle and a transition zone angle of a weak directional gain, where the pickup zone angle of the strong directional gain is smaller than the pickup zone angle of the weak directional gain, the transition zone angle of the strong directional gain is smaller than the transition zone angle of the weak directional gain, and the pickup zone angle of the strong directional gain is smaller than an angle of a main lobe of the pre-selected target voice signal;

a gain calculation unit 42, configured to determine, based on the pickup zone angle and the transition zone angle of the strong directional gain, the strong directional gain that is based on an azimuth angle of a sound source and determine, based on the pickup zone angle and the transition zone angle of the weak directional gain, the weak directional gain that is based on the azimuth angle of the sound source, where the azimuth angle of the sound source refers to an azimuth angle of the pre-selected target voice signal; and a gained signal generation unit 43, configured to obtain the strong gained signal and the weak gained signal according to the strong directional gain and the weak directional gain that are based on the azimuth angle of the sound source, respectively.

Figure 5:
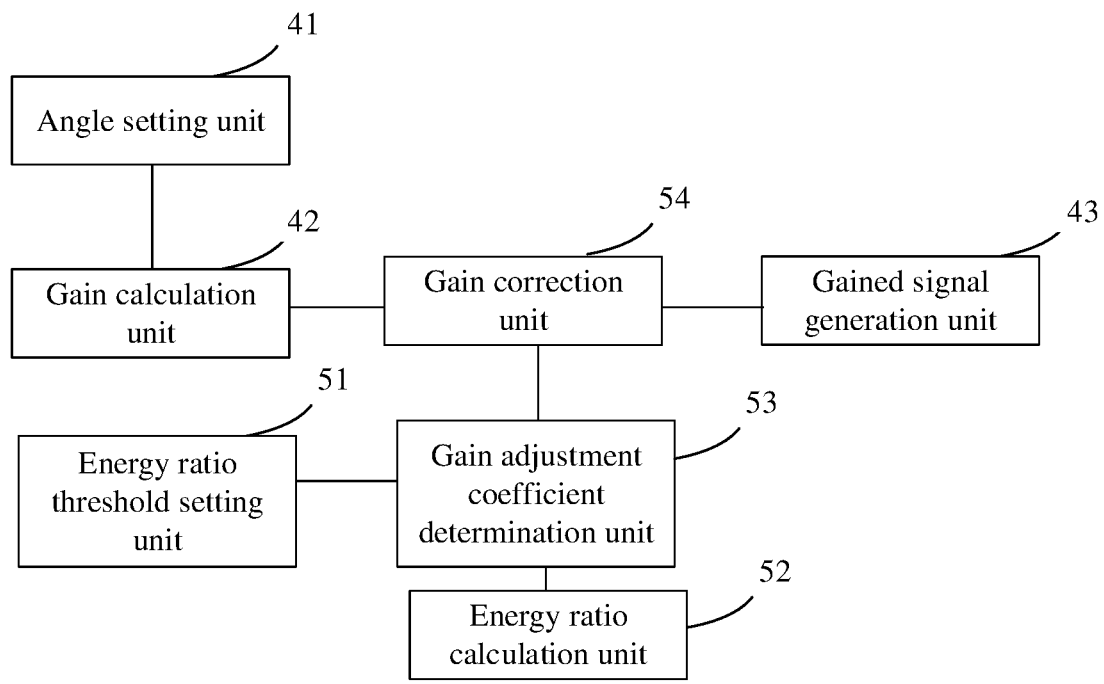
FIG. 5 is another schematic structural diagram of a gaining processing module according to a device embodiment of the present disclosure.

FIG. 5 is another schematic structural diagram of a gaining processing module according to a device embodiment of the present disclosure.

Compared with the embodiment shown in FIG. 4, in this embodiment, the gaining processing module further includes:

an energy ratio threshold setting unit 51, configured to set a high energy ratio threshold and a low energy ratio threshold;

an energy ratio calculation unit 52, configured to calculate a smooth energy ratio γ of the pre-selected target signal to an interference signal;

a gain adjustment coefficient determination unit 53, configured to determine a gain adjustment coefficient based on the smooth energy ratio γ, the high energy ratio threshold and the low energy ratio threshold; and a gain correction unit 54, configured to adjust the strong directional gain and the weak directional gain obtained by the gain calculation unit 42 according to the gain adjustment coefficient.

Accordingly, in this embodiment, the gained signal generation unit 43 needs to obtain the strong gained signal and the weak gained signal according to the strong directional gain and the weak directional gain adjusted by the gain correction unit 54.

In practical applications, the angle setting unit 41 and the energy ratio threshold setting unit 51 described above may be independent from each other or integrated into one piece without limitation to the embodiment of the present disclosure.

Figure 6:
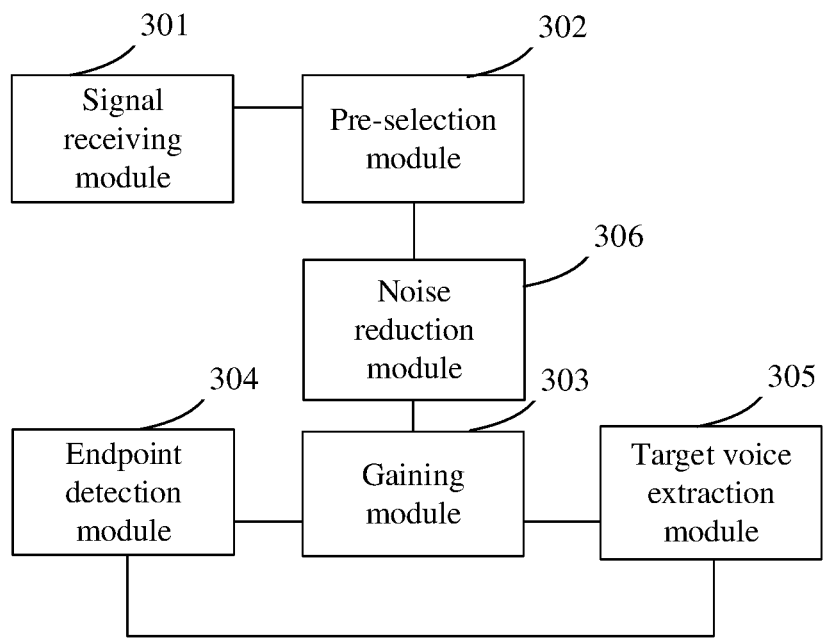
FIG. 6 is another structural block diagram of a device for obtaining a target voice based on a microphone array according to an embodiment of the present disclosure.

FIG. 6 is another structural block diagram of the device. Compared with the embodiment shown in FIG. 3, in this embodiment, the device further includes: a noise reduction module 306 disposed between the pre-selection module 302 and the gaining module 303, and configured to perform self-adaptive filtering and noise reduction processing on the pre-selected target voice signal determined by the pre-selection module 302, such as multi-channel de-reverberation, generalized sidelobe cancellation and other noise reduction processes in the conventional technology, which is not limited in this embodiment of the present disclosure.

The device for obtaining a target voice based on a microphone array is provided in the embodiments of the present disclosure. A voice signal collected based on the microphone array is received, a pre-selected target voice signal and a direction of the pre-selected target voice signal are determined, and then strong directional gaining processing and weak directional gaining processing are performed on the pre-selected target voice signal, to respectively obtain a strong gained signal and a weak gained signal. Since there is less noise signal remaining in the voice signal after being strongly gained, an accurate endpoint detection result can be obtained based on the strong gained signal. The distortion of the target voice is very small in the voice signal after being weakly gained; therefore, a target voice signal with higher fidelity can be obtained by performing endpoint processing on the weak gained signal according to the endpoint detection result.

The embodiments in this specification are described in a progressive manner, and reference can be made to each other of the embodiments for the same or similar parts between the various embodiments. Each embodiment focuses on the differences from other embodiments. Moreover, the device embodiments described above are only schematic, where the units described as separate components may or may not be physically separated, and the components displayed as units may or may not be physical units, that is, they may be located in one place or distributed across multiple network elements. Some or all of the modules may be selected according to actual needs to achieve the objective of the solution of this embodiment. Those of ordinary skill in the art can understand and implement the above without any creative efforts.

The embodiments of the present disclosure have been described in detail above, and specific embodiments are used to explain the present disclosure. The descriptions of the above embodiments are only used to help understand the method and device of the present disclosure. Those of ordinary skill in the art may make changes in the specific implementation and scope of application according to the idea of the present disclosure. Generally, the content of this disclosure should not be construed as a limitation on this application.

The invention claimed is:

1. A method for obtaining a target voice based on a microphone array, the method comprising:
   receiving a voice signal collected based on the microphone array;
   determining a pre-selected target voice signal and a direction of the pre-selected target voice signal;
   performing strong directional gaining processing and weak directional gaining processing on the pre-selected target voice signal to respectively obtain a strong gained signal and a weak gained signal;
   performing an endpoint detection based on the strong gained signal, to obtain an endpoint detection result; and
   performing endpoint processing on the weak gained signal according to the endpoint detection result, to obtain a final target voice signal.

2. The method according to claim 1, wherein determining the pre-selected target voice signal and the direction of the pre-selected target voice signal comprises:
   determining the pre-selected target voice signal and the direction of pre-selected target voice signal through sound source localization.

3. The method according to claim 1, wherein determining the pre-selected target voice signal and the direction of the pre-selected target voice signal comprises:
   performing beamforming processing on the voice signal, to obtain beams in different directions;
   selecting, from the beams in different directions, a beam that satisfies a preset condition, and determining the target voice signal and the direction of the target voice signal based on the selected beam.

4. The method according to claim 1, wherein performing the strong directional gaining processing and the weak directional gaining processing on the pre-selected target voice signal to obtain respectively the strong gained signal and the weak gained signal comprises:
   setting a pickup zone angle and a transition zone angle of a strong directional gain, and a pickup zone angle and a transition zone angle of a weak directional gain, wherein the pickup zone angle of the strong directional gain is smaller than the pickup zone angle of the weak directional gain, and the transition zone angle of the strong directional gain is smaller than the transition zone angle of the weak directional gain;
   determining, based on the pickup zone angle and transition zone angle of the strong directional gain, the strong directional gain that is based on an azimuth angle of a sound source, and determining, based on the pickup zone angle and transition zone angle of the weak directional gain, the weak directional gain that is based on the azimuth angle of the sound source, wherein the azimuth angle of the sound source refers to an azimuth angle of the pre-selected target voice signal; and obtaining the strong gained signal and the weak gained signal according to the strong directional gain and the weak directional gain that are based on the azimuth angle of the sound source, respectively.

5. The method according to claim 4, wherein the pickup zone angle of the strong directional gain is smaller than an angle of a main lobe of the pre-selected target voice signal.

6. The method according to claim 4, wherein performing the strong directional gaining processing and weak directional gaining processing on the pre-selected target voice signal to respectively obtain the strong gained signal and the weak gained signal further comprises:

calculating a smooth energy ratio Y of the pre-selected target signal to an interference signal;

determining a gain adjustment coefficient based on the smooth energy ratio γ, a preset high energy ratio threshold and a low energy ratio threshold; and adjusting the strong directional gain and the weak directional gain according to the gain adjustment coefficient.

7. The method according to claim 6, wherein determining the gain adjustment coefficient based on the smooth energy ratio γ, the preset high energy ratio threshold and the low energy ratio threshold comprises:

setting the gain adjustment coefficient to be 1 in a case that the smooth energy ratio γ is greater than the high energy ratio threshold;

setting the gain adjustment coefficient to be $K_0$ in a case that the smooth energy ratio γ is less than the low energy ratio threshold; and setting the gain adjustment coefficient to be $K_1$ in a case that the smooth energy ratio γ is greater than or equal to the low energy ratio threshold and less than or equal to the high energy ratio threshold, wherein $K_1 > K_0$.

8. The method according to claim 3, further comprising:

performing self-adaptive filtering and noise reduction processing on each beam, before the pre-selected target voice signal and the direction of the pre-selected target voice signal are determined based on the beam that meets the preset condition; or performing self-adaptive filtering and noise reduction processing on the pre-selected target voice signal, after the preselected target voice signal and the direction of the preselected target voice signal are determined.

9. A device for obtaining a target voice based on a microphone array, the device comprising: a hardware processor to:

receive a voice signal collected based on the microphone array;

based on the voice signal, determine a pre-selected target voice signal and a direction of the pre-selected target voice signal;

perform strong directional gaining processing and weak directional gaining processing on the pre-selected target voice signal to respectively obtain a strong gained signal and a weak gained signal;

perform an endpoint detection based on the strong gained signal, and output an endpoint detection result; and perform endpoint processing on the weak gained signal according to the endpoint detection result and the weak gained signal, to obtain a final target voice signal.

10. The device according to the claim 9, wherein to determine a pre-selected target voice signal and a direction of the pre-selected target voice signal, the hardware processor is further to determine the pre-selected target voice signal and the direction of the pre-selected target voice signal through sound source localization.

11. The device according to the claim 9, wherein to determine a pre-selected target voice signal and a direction of the pre-selected target voice signal, the hardware processor is further to:

perform beamforming processing on the voice signal to obtain beams in different directions; and select a beam that meets a preset condition from the obtained beams in different directions, and determine the pre-selected target voice signal and the direction of the pre-selected target voice signal based on the selected beam.

12. The device according to the claim 9, wherein to perform strong directional gaining processing and weak directional gaining processing on the pre-selected target voice signal to respectively obtain a strong gained signal and a weak gained signal, the hardware processor is further to:

set a pickup zone angle and a transition zone angle of a strong directional gain, and a pickup zone angle and a transition zone angle of a weak directional gain, wherein the pickup zone angle of the strong directional gain is smaller than the pickup zone angle of the weak directional gain, and the transition zone angle of the strong directional gain is smaller than the transition zone angle of the weak directional gain;

determine, based on the pickup zone angle and the transition zone angle of the strong directional gain, the strong directional gain that is based on an azimuth angle of a sound source and determine, based on the pickup zone angle and the transition zone angle of the weak directional gain, the weak directional gain that is based on the azimuth angle of the sound source, wherein the azimuth angle of the sound source refers to an azimuth angle of the pre-selected target voice signal; and obtain the strong gained signal and the weak gained signal according to the strong directional gain and the weak directional gain that are based on the azimuth angle of the sound source, respectively.

13. The device according to the claim 12, wherein the pickup zone angle of the strong directional gain is smaller than an angle of a main lobe of the pre-selected target voice signal.

14. The device according to the claim 12, wherein to perform strong directional gaining processing and weak directional gaining processing on the pre-selected target voice signal to respectively obtain a strong gained signal and a weak gained signal, the hardware processor is further to:

set a high energy ratio threshold and a low energy ratio threshold;

calculate a smooth energy ratio Y of the pre-selected target signal to an interference signal;

determine a gain adjustment coefficient based on the smooth energy ratio γ, the high energy ratio threshold and the low energy ratio threshold; and adjust the strong directional gain and the weak directional gain according to the gain adjustment coefficient.

15. The device according to the claim 11, wherein to determine a pre-selected target voice signal and a direction of the pre-selected target voice signal, the hardware processor is further to:

perform self-adaptive filtering and noise reduction processing on each beam responsive to performing beamforming processing on the voice signal to obtain beams in different directions;

or to:
perform self-adaptive filtering and noise reduction processing on the pre-selected target voice signal responsive to determining a pre-selected target voice signal and a direction of the pre-selected target voice signal.

16. A non-transitory computer-readable storage medium, comprising computer program codes, wherein the computer program codes are executed by a computer processor to cause the computer processor to perform the steps in the method for obtaining a target voice based on a microphone array according to claim 1.

17. A device for obtaining a target voice based on a microphone array, the device comprising a processor, a memory, and a system bus, wherein:
the processor and the memory are connected to each other through the system bus; and
the memory is configured to store one or more programs, and the one or more programs comprise instructions that, when executed by the processor, cause the processor to perform the steps in the method for obtaining a target voice based on a microphone array according to claim 1.

18. A non-transitory computer-readable storage medium stored thereon a computer program product that, when running on a terminal device, causes the terminal device to perform the steps in the method for obtaining the target voice based on a microphone array according to claim 1.

\* \* \* \* \*